United States Patent [19]
Hix et al.

[11] 4,399,464
[45] Aug. 16, 1983

[54] SIGNAL PROCESSOR FOR AN ARRAY OF CID RADIATION DETECTOR ELEMENTS

[75] Inventors: Rudolf G. Hix, Diamond Bar; Allen A. Bojorquez, Placentia, both of Calif.

[73] Assignees: General Dynamics, Pomona Division, Pomona, Calif.

[21] Appl. No.: 259,862

[22] Filed: May 4, 1981

[51] Int. Cl.³ .......................... H04N 3/14; H04N 5/33
[52] U.S. Cl. ..................................... 358/213; 358/113
[58] Field of Search ........................ 358/212, 213, 113; 250/211 J, 211 R, 578, 338, 340, 370; 357/24 LR, 30; 365/189, 182

[56] References Cited
U.S. PATENT DOCUMENTS

3,931,463 1/1976 Levine .................................. 358/213
3,983,395 9/1976 Kim ....................................... 357/24

*Primary Examiner*—John C. Martin
*Attorney, Agent, or Firm*—Neil F. Martin; Edward W. Callan; Edward B. Johnson

[57] ABSTRACT

A signal processor for an array of charge injection device (CID) radiation detector elements is disclosed. An integration time control system effectively increases the dynamic range of the detector array by varying the integration times of the detector elements in accordance with measurements of the magnitudes of data signals respectively produced by the detector elements in relation to the saturation thresholds and of the detector elements so as to maintain the amount of radiation stored in a predetermined percentage of the detector elements within a predetermined operating range below their saturation thresholds and above their noise level. A responsivity compensation system adjusts the data signals prior to such measurements to compensate for variations in the responsivity of the detector elements. In response to the identification of a defective detector element, the last previously provided adjusted data signal in the data stream corresponding to a non-defective detector element is reproduced. Background data from the adjusted data signals is suppressed by subtracting a calculated background constant from each adjusted data signal. The suppressed data signal is compressed by being multiplied by a calculated scale factor. The compressed data signal is processed to provide a video display, and it is also stored in a digital memory so that it may subsequently be further processed by any processing system that may be used in conjunction with the signal processor.

22 Claims, 10 Drawing Figures

SIGNAL PROCESSOR FOR AN ARRAY OF CID RADIATION DETECTOR ELEMENTS

BACKGROUND OF THE INVENTION

The present invention generally pertains to processing data signals produced from an array of charge injection device (CID) radiation detector elements, and is particularly directed toward increasing the effective dynamic range of the detector array.

CID radiation detector arrays are useful for producing data signals that may be processed to provide images of objects that emit radiation in a distinct frequency band, such as infrared radiation. A staring mosaic planar array of indium antimonide (InSb) CID infrared radiation detector elements is preferred for an infrared radiation imaging system requiring a large total field of view without requiring an opto-mechanical scanning system.

However, the inherent dynamic range of state-of-the-art CID infrared detector elements, such as InSb is insufficient for many applications such as in a missile tracking system, or in a ground target detection system. Low sensitivity problems arise when trying to differentiate between low temperature contract objects in a scene when the detector array has a limited dynamic range.

Mosaic arrays of CID infrared detector elements also inherently have a fixed pattern noise problem, which arises from the finite differences in responsivities (both A.C. and D.C.) of the detector elements. Non-uniformities ranging from ±5 percent to ±20 percent effectively mask small temperature variations such as are encountered with tactical targets in high-clutter backgrounds.

SUMMARY OF THE INVENTION

The present invention is a signal processor for an array of charge injection device (CID) radiation detector elements that increases the effective dynamic range of the detector array. The signal processor of the present invention essentially includes a drive circuit and an integration time control system. The drive circuit is adapted for driving the elements of the array to produce a stream of individual data signals from the respective detector elements of the array by providing a combination of address signals for individually addressing each detector element and timed drive signals for sequentially clearing or reading data from the addressed detector elements. The magnitude of each data signal is proportional to the amount of radiation stored as charge in the addressed detector element over an integration time between the sequential drive signals for clearing and reading data from the detector element. The integration time control system is coupled to the array for measuring the magnitude of the data signals in relation to the saturation thresholds of the detector elements, and is coupled to the drive circuit for controlling the combination of address signals and time drive signals in response to such measurements to vary the integration time for the detector elements so as to maintain the amount of radiation storage in a predetermined percentage of the detector elements within a predetermined operating range which is below their saturation thresholds to thereby increase the effective dynamic range of the detector array.

The signal processor of the present invention also preferably includes a responsivity compensation system coupled between the array and the integration time control system for adjusting the data signals prior to such measurement by the integration time control system to compensate for variations in the responsivity of the detector elements in the array.

Preferably, the responsivity compensation system includes means for identifying defective detector elements in which the responsivity varies from the average responsivity by more than a given amount, and the signal processor further includes a defective element compensation system coupled between the responsivity compensation system and the integration time control system for providing the adjusted data signals to the integration time control system and for responding to the identification of defective detector element by providing to the integration time control system the last previously provided adjusted data signal in the data stream corresponding to a non-defective detector element.

Even with the effective dynamic range of the detector array being increased, there still is a sensitivity problem in distinguishing very low temperature contrast objects from their background. To solve this problem, the signal processor of the present invention preferably further includes a suppression system coupled to the responsivity compensation system for suppressing background data from the adjusted data signals by subtracting a calculated background constant from each adjusted data signal to thereby provide suppressed data signals. Accordingly, the sensitivity of the detector array is effectively enhanced.

To reduce data processing capacity requirements for the video display system and any additional image data processing system that may be used in conjunction with the signal processor of the present invention the signal processor also preferably includes a compression system coupled to the suppression system for compressing the suppressed data signals by multiplying each suppressed data signal by a calculated scale factor. The compressed data signals are processed to provide a video display in response to the data signals produced by the detector array and are stored in digital memory, ready to be accessed by any additional image processing system that may be used in conjunction with the signal processor of the present invention for a specific application (e.g., a missile tracking application).

Additional features of the present invention are described in the description of the preferred embodiment.

DESCRIPTION OF THE PREFERRED EMBODIMENT

Figure 1:
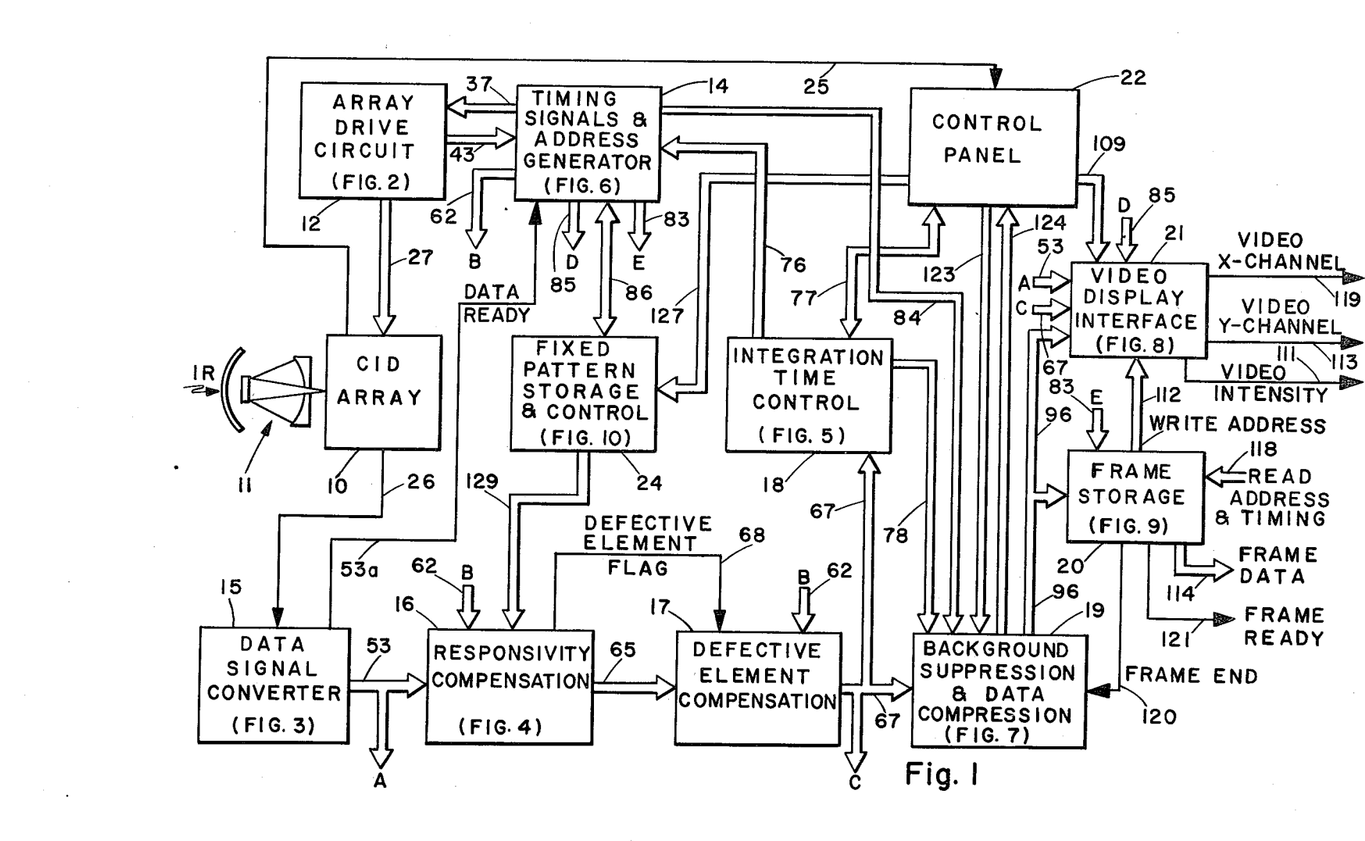
FIG. 1 is a functional block diagram of a preferred embodiment of the signal processor of the present invention.

A functional block diagram of a signal processor according to the present invention is illustrated in FIG. 1 as coupled to a staring mosaic planar array of InSb CID infrared radiation detector elements 10. The CID array 10 is positioned in a focal plane defined by the positioning of the optical elements of an infrared radiation seeker head 11. The head also preferably includes a cryogenic cooling system (not shown) for the CID array 10. The cooling system includes a dewar and a Joule-Thomson cryostat, to optimize the performance of the CID array 10.

The signal processor includes an array drive circuit 12, a timing signals and address generator 14, a data signal converter 15, a responsivity compensation system 16, a defective element compensation system 17, an integration time control system 18, a background suppression and data compression system 19, a frame storage system 20 and a video display interface system 21. The signal processor further includes a control panel 22 and a fixed pattern storage and control system 24.

An array temperature monitoring system (not shown) is included to enhance the utility of the signal processor. The monitoring system includes a temperature-sensing diode located next to the CID array 10. A constant current of approximately 0.2 ma is provided to flow through the temperature-sensing diode, and the voltage drop across the temperature sensing diode is monitored by means of a voltmeter on the control panel 22. The voltmeter is coupled to the temperature sensing diode by signal line 25. The voltage across the temperature-sensing diode is a given function of temperature for the constant diode current; and the voltmeter is calibrated in accordance with such function to provide an indication of the temperature of the CID array located in the immediate proximity of the temperature sensing diode. Accordingly, the temperature of the CID array 10 and the effectiveness of the cooling system may be monitored.

The array drive circuit 12 drives the elements of the CID array 10 to produce a stream of individual analog data signals on line 26 from the respective detector elements of the array 10. The array drive circuit 12 provides on lines 27, a combination of address signals for individually addressing each detector element and timed drive signals for sequentially clearing and/or reading data from the addressed detector elements. The magnitude of each data signal on line 26 is proportional to the amount of radiation stored as charge in the addressed detector element during an integration time, which is defined as the time interval between the sequential drive signals for clearing and subsequently reading data from the detector element.

Integration time control is enhanced by the use of random access decoders (not shown) to access the individual elements of the CID array 10. Such use provides flexibility in clearing or reading any desired number of detector elements as a set to provide the specific desired integration times, without the necessity of utilizing a restricted selection of the detector elements to be cleared and read sequentially (as determined by the CID array configuration) in conjunction with varying the frequency of the timed drive signals to the CID array 10.

Figure 2:
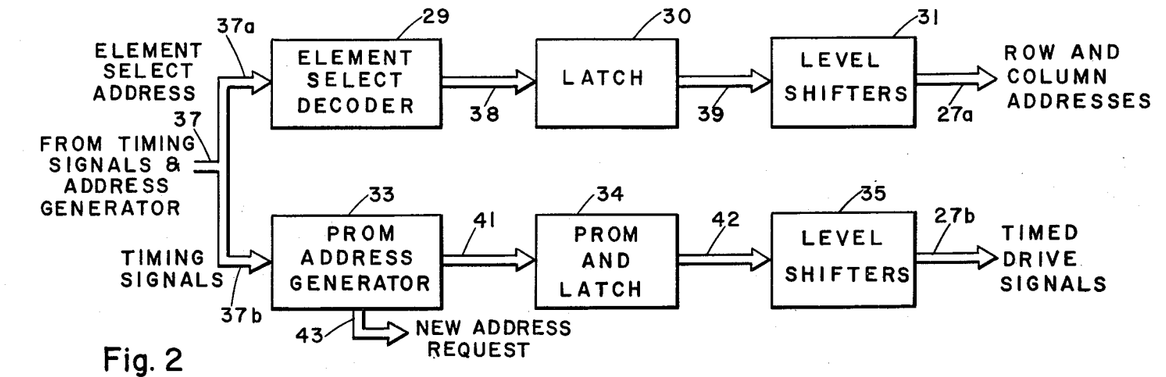
FIG. 2 is a functional block diagram of the array drive circuit included in the signal processor of FIG. 1.

Referring to FIG. 2, the array drive circuit 12 includes an element select decoder 29, a latch 30 and level shifters 31 for providing the address signals to the array 10, and a PROM address generator 33, a PROM and latch circuit 34 and level shifters 35 for providing the timed drive signals to the array 10.

The element select decoder 29 decodes an element select address received on line 37a from the timing signals and address generator 14. The element select address specifies which detector element is to be read or cleared. The element select decoder is implemented with PROMs. Upon decoding the element select address, the element select decoder 29 provides separate row and column addresses on lines 38 to the latch 30. The row and column addresses indicate the row and column in the array 10 of the detector element that is to be addressed and driven. The level shifters 31 shift the D.C. voltage levels of the row and column addresses provided on lines 39 from the latch 30 in order to provide row and column address signals on lines 27a to the array 10 that are compatible with the operation of the detector array 10.

The PROM address generator 33 contains a clock and a counter which respond to timing signals on lines 37b from the timing signals and address generator 14 by generating address signals on lines 41 to the PROM and latch circuit 34. This PROM responds to the address signals on lines 41 by providing a series of drive signals that are required for driving an individual InSb CID infrared radiation detector element in order to clear the detector element or to read the data from the detector element. The clock to drive this PROM is inherent in the adress signals on lines 41. These drive signals are latched and then provided on lines 42 to the level shifters 35, which shift the D.C. voltage levels of the drive signals on lines 27b to the array 10 that are compatible with the operation of the detector elements of the array 10.

The composition of the series of drive signals required for the detector elements with which the signal processor used is specified by programming the PROM in the circuit 34. The timing between each series of drive signals on lines 27b can be changed by changing the timing signals on line 37b from the timing signals and address generator 14 which qualify the clock and control the counter in the PROM address generator 33 to implement the desired change.

While causing the timed drive signals for clearing or reading a detector element of the CID array 10, the PROM address generator 33 also provides a new address request on signal lines 43 to the timing signals and address generator 14 for causing the generator 14 to provide the next element select address and the requisite timing signals on signal lines 37 for reading or clearing the next detector element of the CID array 10.

Figure 3:
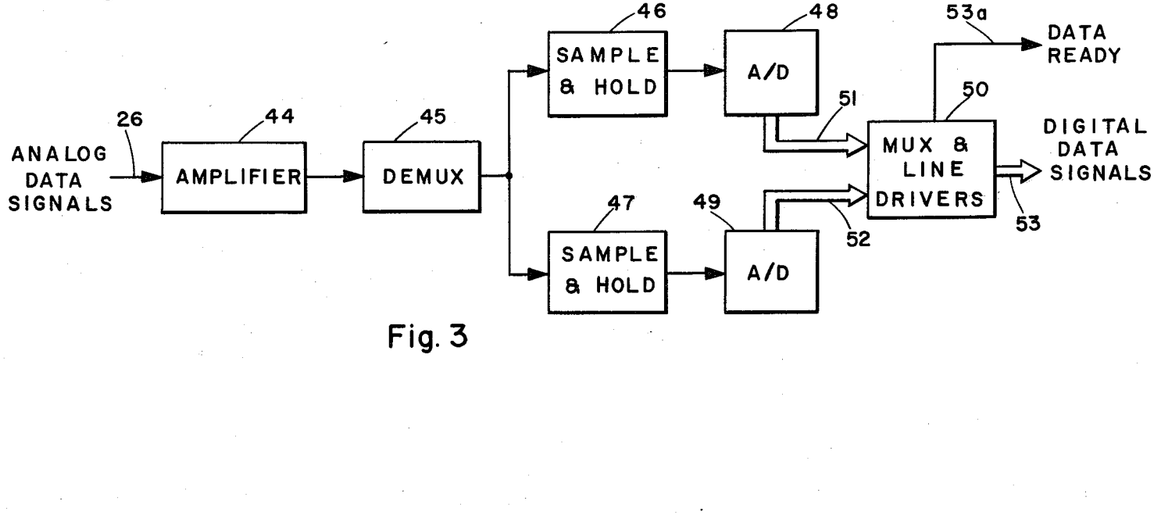
FIG. 3 is a functional block diagram of the data signal converter included in the signal processor of FIG. 1.

Referring to FIG. 3, the data signal converter processor 15 includes an amplifier 44, a demultiplexer 45, two sample and hold circuits 46 and 47, two analog-to-digital converters 48 and 49 and a multiplexer and line drivers circuit 50. The stream of analog data signals on line 26 from the detector array 10 is amplified by the amplifier 44 and split by the demultiplexer 45 so that successive data signals in the stream are alternately provided to the sample-and-hold circuit 46 and the sample and hold circuit 47. The analog-to-digital converters 48 and 49 respectively digitize the analog data signals held in the sample and hold circuits 46 and 47 and provide digital data signals on lines 51 and 52. It is necessary to split the analog data signal into the separate channels defined by the separate sample-and-hold circuits 46 and 47 and the separate analog-to-digital converters 48 and 49 due to speed/accuracy limitations of state-of-the art analog-to-digital converters. The separate sample-and-hold circuits 46 and 47 hold the analog signal levels long enough for the separate analog-to-digital converters to digitize the data signals to the bit accuracy required to correctly quantify the signal-to-background contrast required for application of the InSb detector array for the desired signal extraction and processing (e.g. for a missile tracking application). The digital data signals on lines 51 and 52 are combined by the multiplexer 50 to provide a stream of digital data signals on lines 53 corresponding to the stream of analog data signals on line 26 from the CID array 10. A data ready signal is provided on line 53a, from the data signal converter 15 to the timing signals and address generator 14 to indicate that a digital datum has been converted to thereby cause the generator 14 to command the start of processing this digital datum through the rest of the signal processor.

Figure 4:
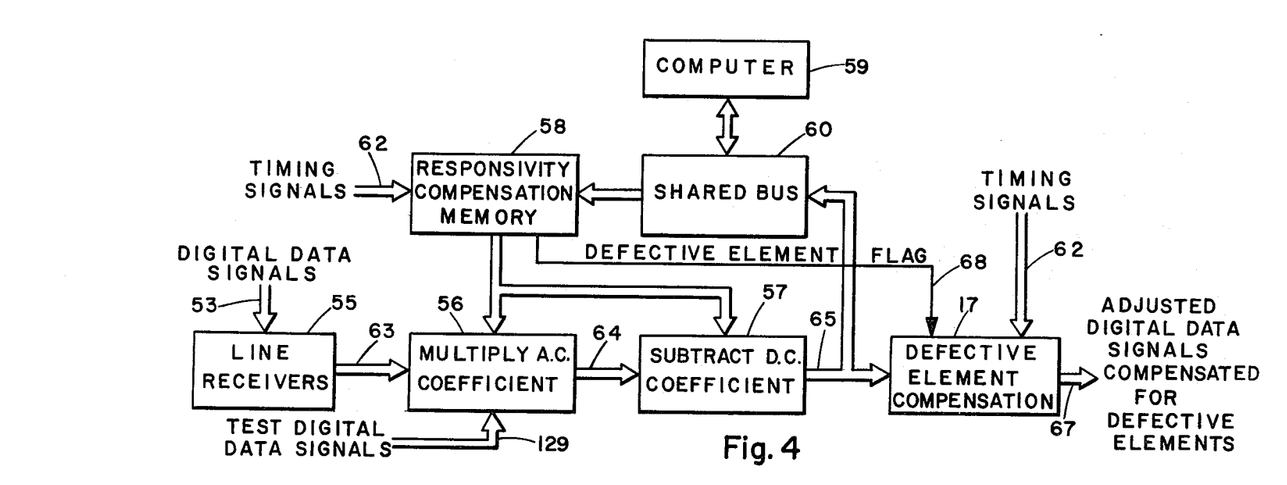
FIG. 4 is a functional block diagram of the responsivity compensation system and the defective element compensation system that are included in the signal processor of FIG. 1.

The responsivity compensation system 16 adjusts the data signals on lines 53 to compensate for variations in the responsivity of the detector elements of the array 10. Referring to FIG. 4, the responsivity compensation system 16 includes line receivers 55, a multiplier 56, a subtraction function device 57, a memory 58, a computer 59 and a shared bus 60. The operation of the memory 58 is synchronized by timing signals provided on lines 62 from the timing signals and address generator 14.

The line receiver 55 sharpen each of the digital data signals received on line 53 and provides a stream of sharpened data signals on lines 63. The multiplier 56 multiplies the data signal on lines 63 by an A.C. responsivity coefficient calculated for the detector element from which the data signal is provided to thereby provide a first calculated signal on lines 64. The subtraction device 57 subtracts from the first calculated signal a D.C. responsivity coefficient calculated for the detector element from which the data signal is provided to thereby provide the adjusted data signal on lines 65. The subtraction function device 57 preferably is a digital adder that performs a subtraction function by adding the 2's complement of a digital signal representing the D.C. responsivity coefficient.

The computer 59 is used for calculating the A.C. and D.C. responsivity coefficients for each detector element in the array; and the memory 58 stores the calculated A.C. and D.C. responsivity coefficients for use by the multiplier 56 and the subtraction device 57 respectively.

The responsivity coefficients are calculated by the computer 59 from data obtained from two temperature calibration points for each detector element. A uniform blackbody is presented to the array, set at 305 degrees Kelvin for the first calibration temperature. A minimum of one hundred samples are taken for each detector element (at each temperature) and averaged to assure accuracy. The computer 59 is a model PDP-11/34 and the software program for calculating the responsivity coefficients is written in the FORTRAN IV programming language.

Each of the data signals contains 12 bits. The coefficients are calculated and stored with a 13-bit acuracy, thereby assuring that no information contained in the data quantified by the data signal converter 15 is lost by the compensation algorithm.

The calibration procedure is performed before the signal processor of the present invention is operated for any specific purpose (e.g., missile tracking). The frequency of performing the calibration procedures depends upon the performance stability of the specific CID array in use.

The utility of the signal processor of the present invention is enhanced by providing a non-volatile memory for the responsivity compensation memory 58, either by using non-volatile memory components or by providing a battery back-up power supply to the memory, so that the contents of the memory, namely the responsivity compensation coefficients, are not to be lost wherever the power supply of the signal processor of the present invention is shut off. This enhancement reduces the number of times that the calibration procedure must be performed.

The computer 59 further identifies defective detector elements in which the responsivity varies from the average responsivity by more than a given amount, such as preferable 50 percent. For each defective detector element a defective element flag is set and stored in the memory 58.

The defective element compensation system 17 is coupled between the responsivity compensation system 16 and the integration time control system 18 for providing the adjusted data signals from lines 65 to integration time control system 18 on lines 67. The defective element compensation system 17 responds to a defective element flag signal on line 68 from the memory 58 by providing to the integration time control system 18 on lines 67 the last previously provided adjusted data signal in the data stream corresponding to a non-defective detector element. The defective element compensation system 17 includes a memory for storing the last previously provided adjusted data signal. The operation of the memory of the defective element compensation system 17 also is synchronized by timing signals provided on lines 62 from the timing signals and address generator 14. The defective element compensation function eliminates false data points that could be misinterpreted as structure or objects in the infrared thermal scene. For example, in target tracking systems, such false data points could be misinterpreted as either negative-contrast or positive-contrast targets.

The integration time control system 18 measures the magnitude of the adjusted data signals (as compensated for defective elements) on lines 67 in relation to the saturation thresholds of the detector elements. The integration time control system 18 is coupled to the array drive circuit 12 by the timing signals and address generator 14 for controlling the combination of address signals and timed drive signals provided to the detector elements in response to such measurements to vary the integration times for the detector elements so as to maintain the amount of radiation stored in the detector elements within a predetermined operating range, which is below their saturation thresholds, to thereby increase the effective dynamic range of the detector array.

Figure 5:
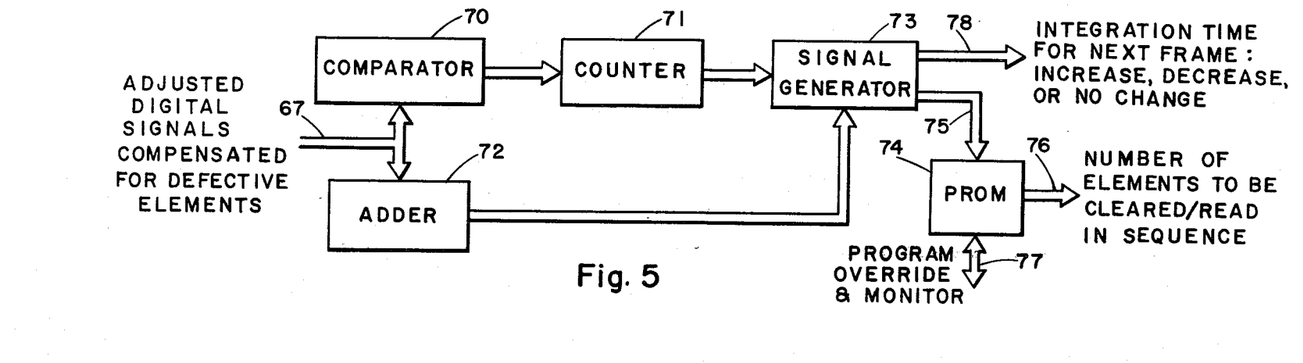
FIG. 5 is a functional block diagram of the integration time control system included in the signal processor of FIG. 1.

Referring to FIG. 5, the integration time control system 18 includes a comparator 70, a counter 71, an adder 72, a signal generator 73 and a PROM 74.

The comparator 70 compares the magnitude of the adjusted data signals on lines 67 to a predetermined percentage (preferably 75 percent) of the saturation threshold of the detector elements.

The counter 71 counts the number of adjusted data signals whose magnitude exceeds said predetermined percentage from the total number of adjusted data signals corresponding to a single complete frame of adjusted data signals (i.e., one adjusted data signal from each detector element).

The adder 72 adds all the magnitudes of the adjusted data signals on lines 67 for one complete frame of adjusted data signals.

The signal generator 73 provides an address on lines 75 to the PROM 74. the PROM 74 responds by providing signals on lines 76 to cause the timing signals and address generator 14 to decrease the number of detector elements in a set for the next clearing and reading of the entire array (i.e., the next frame) when the count of adjusted data signals in each of a predetermined number (preferably two) of contiguous sets of two or more adjacent adjusted data signals in a frame exceeds a predetermined percentage (preferably 75 percent) of said number of detector elements in the set. In this manner, the signal generator 73 implements the criterion to decrease the integration time for the next frame, based upon the number of data signals counted by the counter 71. The evaluation for a change in integration time is performed by the signal generator 73 at the end of a frame but before the start of the next frame, so that if the criterion is satisfied, the number of detector elements cleared and read as a set in sequence reflects the decrease in integration time (due to a decrease in the number of elements constituting a set to be cleared and read). The value of this set remains constant until the entire frame is read.

The signal generator 73 also implements the criterion to increase the integration time of the detector elements in the next frame by incrementing the address on signal lines 75 to cause the PROM 74 to provide signals on line 76 to force the timing signals and address generator 14 to increase the number of detector elements in a set for the next clearing and reading of the entire array when the cumulative sum of all adjusted data signals for a complete frame provided by the adder 72 is less than a predetermined percentage (preferably 25).

If the implementation of the integration time control criteria performed by the signal generator 73 indicates that both the decrease criterion, based upon the data signals provided by the counter 71, the increase criterion, based on the data signals provided by the adder 72, are satisfied concurrently, the signal generator 73 will force the implementation of the decrease criterion (i.e., the decrease criterion dominates over the increase criterion).

If neither criteria for increasing or decreasing the integration time as satisfied at the end of a frame, the integration time for the next frame is unchanged.

The signal generator 73 also provides data signals on lines 78 to the background suppression and data compression system 19 to indicate if the integration time for the next frame will be increased, decreased or remain unchanged, so that the system 19 can modify the background constant and scale factor to accomodate the change in integration time.

The PROM 74 responds to the address signal on lines 75 by providing a signal on lines 76 to the timing signals and address generator 14 to indicate said number of detector elements in a set to be cleared and read. Such number of detector elements remains constant until all the detector elements have been read (i.e., the integration time for all the detector elements remains constant during any single frame).

The PROM 74 is programmed with a specific value of each address, corresponding to the number of elements to be cleared and read in sequence to cause the implementation of a specific integration time. The numerical values programmed in the PROM 74 are such that increasing addresses correspond to increasing integration times, and the values stored in adjacent addresses vary by increments corresponding to a change in integration time that is a constant factor(preferably a factor of two), so that to increase the integration time by one increment, the address on signal lines 75 is incremented, and to decrease the integration time by one increment, the address on signal lines 75 is decremented.

The output of the PROM 74 (i.e., the data on signal lines 76) is monitored by the control panel 22 over signal lines 77. Also, inputs on signal lines 77 from the control panel 22 can cause the PROM 74 to override the address on signal lines 75 and force any address set at the control panel to be accessed, thereby causing the contents at the address to be sent to the timing signals and address generator 14 to implement a specific integration time (irrespective of the address on signals lines 75). This capability is essential during the calibration procedure, during which the computer 59 (see FIG. 4) calculates the responsivity coefficients and defective element flags and stores these calculated values in the responsivity compensation memory 58 of the responsivity compensation system 16.

The timing signals and address generator 14 is coupled between the integration time control system 18 and the array drive circuit 12 for causing the array drive circuit 12 to provide address signals to the detector elements in sequences that cause a set of a number of the detector elements to be addressed sequentially for being cleared and then addressed again sequentially for reading data prior to a contiguous set of said number of the detector elements being addressed sequentially for being cleared. Said number is varied in response to the measurements by the integration time control system 18. The integration time is increased by increasing said number.

Figure 6:
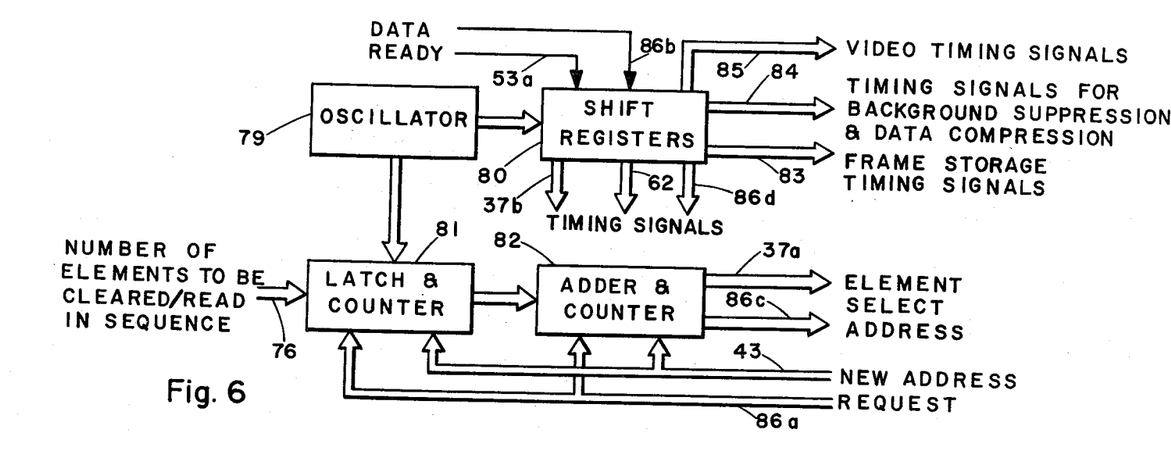
FIG. 6 is a functional block diagram of the timing signals and address generator included in the signal processor of FIG. 1.

Referring to FIG. 6, the timing signals and address generator 14 includes an oscillator 79, shift registers 80, a latch and counter circuit 81 and an adder and counter circuit 82. The shift registers 80 are coupled to the oscillator 79 and the data signal converter 15. The shift registers 80 respond to data signal on line 53a from the data signal converter 15 by providing timing signals on lines 37b to the array drive circuit 12, on lines 85 to the video display interface system 21, and on lines 83 to the frame storage system 20 and on lines 62 to the responsivity compensation system 16 as well as the defective element compensation system 17. The generator 14 further provides timing signals (including a frame start signal) on lines 84 to the background suppression and data compression system 19.

The latch and counter circuit 81 and the adder and counter circuit 82 are coupled to the oscillator 79 to provide the element select addresses on lines 37a to the array drive circuit 12. The number of detector elements to be cleared or read in sequence is latched into the latch of the circuit 81 in order to establish the integration time for the next frame. During each clear or read cycle in a frame, a new address is requested by a signal on lines 43 from the array drive circuit 12 after each detector element is cleared or read. The latch and counter circuit 81 controls the number of detector elements in a set that are cleared in sequence before being read in the same sequence. The adder and counter circuit 82 controls the addresses being provided one lines 37a such that after the indicated number of detector elements in a set have been cleared and read, the addresses are generated for the subsequent set of detector elements to be cleared in sequence and then read in sequence.

Whenever the signal processor of the present invention is in the fixed pattern mode of operation, the timing signals and address generator 14 performs in the same manner as described, but with the following exceptions. The shift registers 80 receive the data ready signal on line 86b from the fixed pattern storage and control system 24 (rather than on line 53a from the data signal converter 15). The new address request is provided on signal lines 86a to the latch and counter circuit 81 and the adder and counter circuit 82 from the fixed pattern storage and control system 24 (rather than on lines 43 from the array drive circuit 12), and timing signals are provided to the fixed pattern storage and control system 24 on signal lines 86d to synchronize the operation of system 24. Also, the element-select address is sent on signal lines 86c to the fixed pattern storage and control system 24.

The background suppression and data compression system 19 enhances the contrast ratio of the data, and optimizes the data resolution by suppressing a majority of the background in a scene, and compressing the data to provide small digital word output data signals on line 96 without sacrificing the resolution of low signal-to-noise ratio targets. The compression of the data into smaller digital words greatly reduces the computing power and complexity required by any subsequent signal processing that may be used in conjunction with the signal processor of the present invention for some specific application (e.g., a missile tracking system).

The background suppression portion of the system 19 is coupled to the defective element compensation system 17 for suppressing background data from the adjusted data signals received on lines 67 by subtracting a calculated background constant from each adjusted data signal to thereby provide suppressed data signals.

The background suppression and data compression system 19 includes digital logic circuits for calculating the background constant for each frame of data signals from all of the detector elements in the array 10 for use in subtraction from each adjusted data signal in the next subsequent frame of adjusted data signals. The background constant equals:

$$B = \frac{C(A - B)}{FS - 2C},$$

wherein

A is the magnitude of the maximum value of the adjusted data signals in the frame;

B is the magnitude of the minimum value of the adjusted data signals in the frame;

C is a predetermined growth margin; and

FS is the full scale value of the output data signals on lines 96.

The digital logic circuits which calculate the value of the background constant further provide for setting the background constant for the next frame equal to zero whenever the calculations result in a negative background constant (i.e., the background constant value is always subtracted from the adjusted data signals-never added).

The data compression portion of the system 19 is coupled to the background suppression portion for compressing the suppressed data signals by multiplying each suppressed data signal by a calculated scale factor to provide compressed output data signals on lines 96 to the frane storage system 20 and the video display interface system 21. The digital logic circuits of the system 19 calculate the scale factor for each frame or suppressed data signals from the values of adjusted data signals on lines 67 from all of the detector elements in the array for use in multiplying each suppressed data signal in the next subsequent frame of suppressed data signals. The scale factor equals:

$$\frac{FS - 2C}{A - B}$$

However, the digital logic circuits further provide for setting the scale factor for use in multiplying each suppressed data signal in the next subsequent frame at unity when (A−B) is less than a predetermined value (i.e., the suppressed data signals will not be compressed if their range in a frme is small). Therefore, the value of the scale factor will always be less than or equal to unity.

Figure 7:
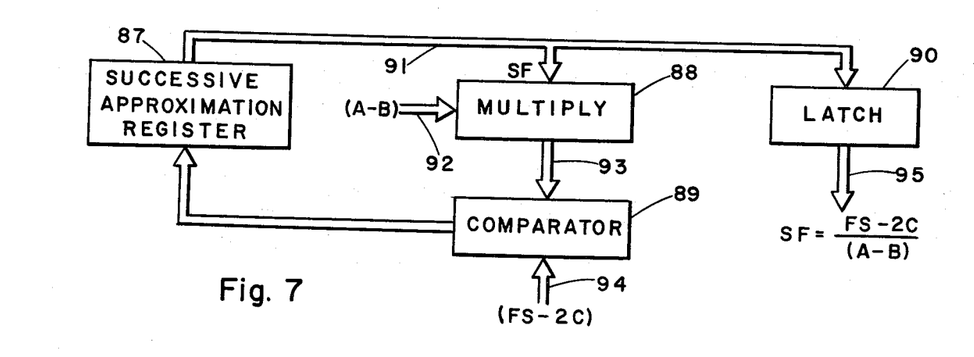
FIG. 7 is a functional block diagram of a circuit used to perform a division function in the data compression provided by the background suppression and data compression system included in the signal processor of FIG. 1.

Since the calculation of the scale factor requires a divide operation, and since the scale factor is calculated between frame reads (6 milliseconds of time available in typical applications), the divide operation has been implemented with a recursive multiply/compare algorithm. This saves the necessity of designing a complicated divider circuit. The operation of the implemented divider circuit is shown in FIG. 7.

This circuit includes a successive approximation register 87, a multiplier 88, a comparator 89 and a latch circuit 90.

The multiplier 80 multiplies the output of the successive approximation register 87 on lines 91 by the value of (A−B) provided on lines 92.

The comparator 89 compares the output of the multiplier 88 on lines 93 with the value of (FS−2C) provided on lines 94. The comparator 89 is coupled to the successive approximation register 87 for incrementing the successive approximation register 87 until the comparison is equal, whereupon the value of the scale factor is provided at the output 91 of the successive approximation register, entered into the latch 90 and provided on line 95 for use in compressing the suppressed data signals.

The system 19 receives timing signals on lines 84 from the timing signals and address generator 14 to key the start of each frame as well as each subtraction of the background constant and the multiplication of the scale factor. However, the background suppression and data compression system 19 receives a frame end signal from the frame storage system 20 on signal line 120 to cause the system 19 to start calculation of the background constant and the scale factor for the next frame. The system 19 also receives a signal on lines 78 from the integration time control system 18 each time the integration time is increased or decreased, since it is necessary to change the value of the background constant and the scale factor in the system 19 in accordance with the integration time applicable in the next frame.

The values of the background constant and the scale factor are displayed on control panel 22 by means of the signals on lines 124. Furthermore, the control panel 22 can provide inhibit signals on lines 123 to inhibit the operation of the background suppression and data compression system 19 by forcing the background constant value to zero and forcing the scale factor value to unity.

Figure 8:
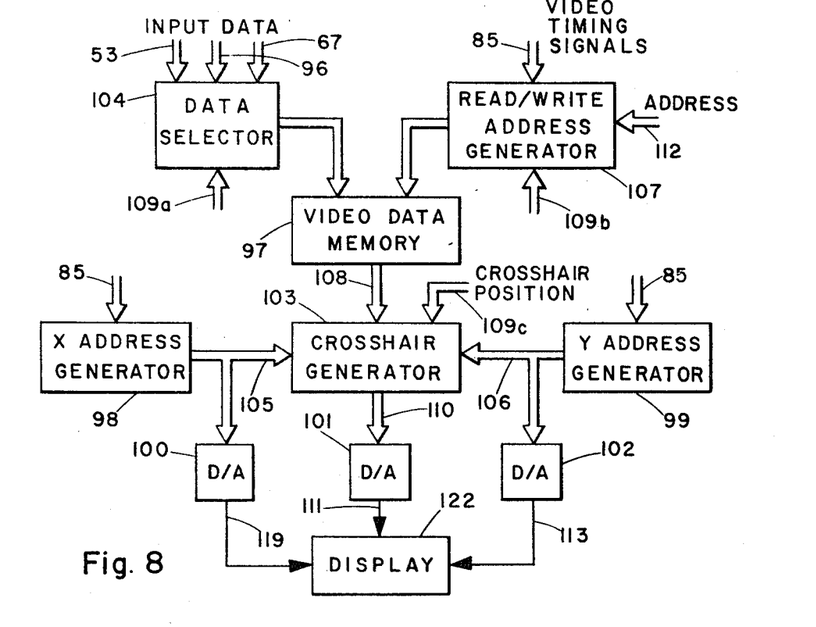
FIG. 8 is a functional block diagram of the video display interface system of the signal processor of FIG. 1.

Referring to FIG. 8, the video display interface system 21 includes a read/write address generator 107, a video data memory 97, an "x" address generator 98, a "y" address generator 99, three digital-to-analog converters 100, 101, and 102, a crosshair generator 103 and a data selector 104. The video display interface system 21 interfaces the signal processor with a video display device 122. Data signals representing video frames to be displayed are provided to the interface system 21 from three possible sources: from the data signal converter 15 on lines 53, from the defective element compensation system 17 on lines 67, or from the background suppression and data compression system 19 on lines 96. The selection of which of these three sources of video data is to be displayed is controlled by a selection switch on control panel 22 via the signals on lines 109a, and the selection is implemented by the data selector 104.

The system 21 will cause the display of every second video frame processed by the signal processor. During any frame time, the system 21 will either load one frame of video data into the memory 97, or display the video frame data stored in the memory 97. Thus the frame rate of the display 122 is one-half of the frame rate of the signal processor.

When the system 21 is in a "frame load" cycle of operation, a frame of data signals provided by the data selector 104 is stored in the memory 97. The addresses for storing these data signals are provided by the read/write address generator 107 directly from the addresses provided on signal lines 112 from the frame storage system 20 when the video data source is the output of the background suppression and data compression system 19. However, when the video data source is the output of the data signal converter 15 or the defective element compensation system 17, the read/write address generator 107 generates the addresses from the timing signals provided on signal lines 85 from the timing signals and address generator 14, and the control signals provided on lines 109b from the control panel 22.

When the video display interface system 21 is in the display cycle of operation, the video data stored in memory 97 is provided to the crosshair generator 103 on signal lines 108 in such a manner as to subsequently cause the display of an enlarged form (preferably three-by-three) of each data element in the memory 97. During the display operation cycle the addresses and timing for the memory 97 are generated by the read/write address generator 107 from the video timing signals provided on signal lines 85 by the timing signals and address generator 14.

The "x" address generator 98 and the "y" address generator 99 simultaneously generate "x" and "y" coordinate address signals on lines 105 and 106 respectively from the video timing signals provided on lines 85 from the timing signals and address generator 14. These signals on lines 105 and 106 are digital signals which are converted into analog signals buy the digital-to-analogs converters 100 and 102 respectively for provision to the video display device 122. The x-channel input signal is provided on line 119 and the y-channel input signal is provided on line 113.

The crosshair generator 103 modifies the data signals on lines 108 to cause the image of a crosshair to be superimposed on the video display device 122 with the image provided in response to the data signals on lines 108. The position of the crosshair is controlled in response to a crosshair position signal provided on lines 109c to the crosshair generator 103 from the control panel 22. These crosshair position signals may be provided to the control panel 22 by any external source (e.g., a target tracking system).

The modified data signal is provided by the crosshair generator on lines 110 to the digital-to-analog converter 101, which converts the modified data signal into an analog video intensity signal on line 111 for providing video intensity information to the video display device 122 concurrently with the analog video "x" and "y" coordinate signals provided from the digital-to-analog converters 100 and 102 on lines 119 and 113, respectively.

Figure 9:
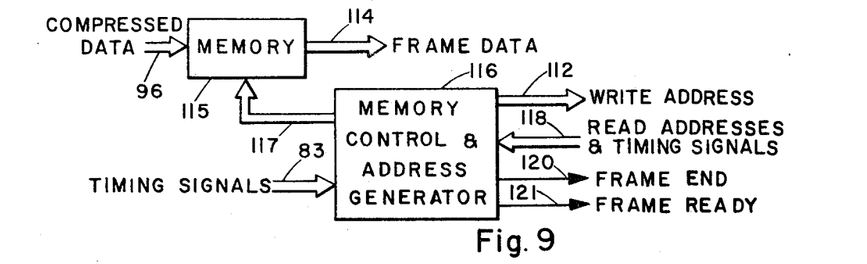
FIG. 9 is a functional block diagram of the frame storage system of the signal processor of FIG. 1.

The frame storage system 20 stores a frame of compressed data signals from lines 96 so that the frame data signals can be provided to any additional algorithmic processor(s) that may be used in conjunction with the signal processor of the present invention for any specific purpose (e.g., a target tracker) on lines 114 at a rate prescribed by said algorithmic processor(s). Referring to FIG. 9, the frame storage system 20 includes a memory 115 and a memory control and address generator 116.

The memory 115 stores a frame of compressed data signals from lines 96. During the "store" mode of operation, the addresses for storing these data signals are provided on lines 117 from the memory control and address generator 116 in response to timing signals received on lines 83 from the timing signals and address generator 14 These addresses are further provided from the memory control address generator 116 to the video desplay interface system 21 on signal lines 112. After a frame of compressed data signals is stored, a frame end signal is provided on line 120 to the background suppression and data compression system 19 and a frame ready signal is provided on line 121 to any algorithmic or image processors that may be used in conjunction with the signal processor of the present invention for a specific application (e.g., a target tracker).

Read addresses and timing signals are provided on lines 118 from such an additional processor to cause the memory control and address generator 116 to provide signals on lines 117 to the memory 115 to cause the frame of compressed data signals to be provided on lines 114 from the memory 115 at a rate determined by the timing signals received on lines 118.

Figure 10:
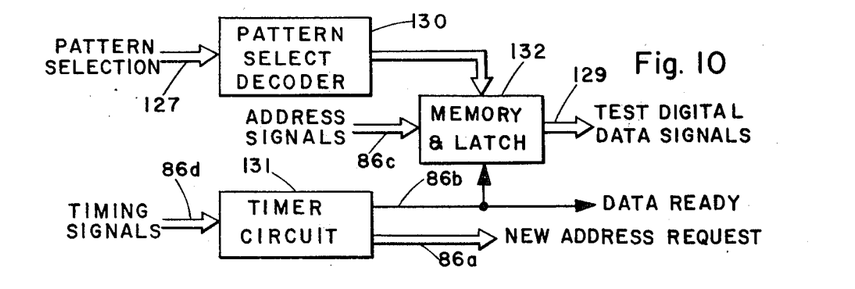
FIG. 10 is a functional block diagram of the fixed pattern storage and control system, of the signal processor of FIG. 1.

The fixed pattern storage and control system 24 facilitates testing of the signal processor. The system 24 contains four full frames of simulated video scenes. During test operations, the detector array 10 is bypassed, and a selected fixed pattern frame of data signals are provided on lines 129 to the responsivity compensation system 16 in lieu of the data signals normally provided on lines 63 (FIG. 4), while the requisite timing and interface signals are provided on lines 86 from and to the timing signals and address generator 14.

The system 24 includes a pattern select decoder 130, a timer circuit 131, and a memory and latch circuit 132. The memory 132 includes PROMs for storing a number of different fixed pattern frames of test data signals. The pattern selection is determined by a signal on lines 127 from the control panel 22. The selected fixed pattern test data signals are read from the memory and into the latch of the circuit 132 in response to address signals on lines 86c from the timing signals and address generator 14, and the data ready signal is provided on line 86b by the timer circuit 131 in response to the timing signals on lines 86d (also from the timing signals and address generator 14). Test digital data signals are provided on lines 129 from the latch of the circuit 132.

The timer circuit 131 responds to the timing signals on lines 86d to further provide a new address request signals on lines 86a and a data ready signal on ines 86b to the timing signals and address generator 14.

The signal processor processes the test data signals provided on lines 129 in the same manner as the data signals normally provided from the detector array on lines 63 to thereby test whether the signal processor is functioning properly.

We claim:

1. A signal processor for an array of charge injection device (CID) radiation detector elements, comprising
   drive means for driving the elements to the array to produce a stream of individual data signals from the respective detector elements of the array by providing a combination of address signals for individually addressing each detector element and timed drive signals for sequentially clearing and reading data from the addressed detector elements, wherein the magnitude of each data signal is proportional to the amount of radiation stored as charge in the addressed detector element over an integration time between said sequential drive signals for clearing and reading data from the detector element; and
   integration time control means coupled to the array for measuring the magnitude of the data signals in relation to the saturation thresholds of the detector elements, and coupled to the drive means for controlling the combination of address signals and timed drive signals in response to said measurements to vary the integration times for the detector elements so as to maintain the amount of radiation stored in a predetermined percentage of the detector elements within a predetermined operating range below their saturation thresholds to thereby increase the effective dynamic range of the detector array.

2. A signal processor according to claim 1, further comprising
   first compensation means coupled between the array and the integration time control means for adjusting the data signals prior to said measurement by the integration time control means to compensate for variations in the responsivity of the detector elements in the array.

3. A signal processor according to claim 2, wherein the first compensation means includes means for identifying defective detector elements in which the responsivity varies from said average responsivity by more than a given amount, the signal processor further comprising
   second compensation means coupled between the first compensation means and the integration time control means for providing the adjusted data signals to the integration time control means and for responding to the identification of a defective detector element by providing to the integration time control means the last previously provided adjusted data signal in the data stream corresponding to a non-defective detector element.

4. A signal processor according to claim 3, wherein the second compensation means further includes means for storing said last previously provided adjusted data signal.

5. A signal processor according to claim 2, wherein the means for adjusting the data signals comprises
   means for multiplying the data signal by an A.C. responsivity coefficient calculated for the detector element from which the data signal is provided to thereby provide a first calculated signal; and
   means for subtracting from the first calculated signal a D.C. responsivity coefficient calculated for the detector element from which the data signal is provided to thereby provide the adjusted data signal.

6. A signal processor according to claim 5, wherein the first compensation means further includes
   means for calculating the A.C. and D.C. responsivity coefficients for each detector element in the array; and
   means for storing the calculated A.C. and D.C. responsivity coefficients for use by said multiplying means and said subtracting means respectively.

7. A signal processor according to claim 1, further comprising
   address means coupled between the integration time control means and the drive means for causing the drive means to provide address signals to the detector elements in sequences that cause a set of a number of the detector elements to be addressed sequentially for being cleared and then addressed again sequentially for reading data prior to a contiguous set of said number of the detector elements being addressed sequentially for being cleared, wherein said number is varied in response to said measurements by the integration time control means.

8. A signal processor according to claim 7, wherein the integration time control means comprises
   a comparator for comparing the magnitude of the adjusted data signals to a predetermined percentage of the saturation threshold of the detector elements;
   means for counting the number of adjusted data signals that exceed said predetermined percentage from the total number of adjusted data signals corresponding to a complete frame of adjusted data signals;
   addition means for adding the magnitudes of the adjusted data signals in a complete frame of adjusted data signals; and
   means for causing the address means to decrease said number of detector element in a set for the next clearing and reading of the entire array when said count of adjusted data signals in each of a predetermined number of contiguous sets of said adjusted data signals exceeds a predetermined percentage of said number of detector elements in the set, and for causing the address means to increase said number of detector elements in a set for the next clearing and reading of the entire array when the added magnitudes of the adjusted data signals in said set of adjusted data signals is less than a predetermined percentage of the cumulative saturation thresholds for all of the detector in the array and said counts for the predetermined number of contiguous sets do not exceed said predetermined percentage of detector elements in the set.

9. A signal processor according to claim 1, further comprising
   suppression means coupled to the array for suppressing background data from the data signals by subtracting a calculated background constant from each data signal to thereby provide output data signals in which said background data is suppressed.

10. A signal processor according to claim 9, wherein the suppression means includes means for calculating said background constant for each frame of data signals from all of the detector elements in the array for use in subtraction from each data signal in the next subsequent frame of data signals, wherein the background constant equals:

$$B - \frac{C(A-B)}{FS - 2C},$$

wherein
   A is the magnitude of the maximum value of the data signals in the frame;
   B is the magnitude of the minimum value data signal in the frame:
   C is predetermined growth margin; and
   FS is the full scale value of the output data signals.

11. A signal processor according to claims 9 or 10 further comprising
   compression means coupled to the suppression means for compressing the suppresed data signals by multiplying each suppressed data signal by a calculated scale factor.

12. A signal processor according to claim 11, wherein the compression means includes
   means for calculating said scale factor for each frame of suppressed data signals from all of the detector elements in the array for use in multiplying each suppressed data signal in the next subsequent frame of suppressed data signals, wherein the scale factor equals:

$$\frac{FS - 2C}{(A - B)};$$

and
   means for setting the scale factor for use in multiplying each suppressed data signal in the next subsequent frame at unity when the (A−B) is less than a predetermined value, thereby assuring that the value of the scale factor will always be less than or equal to unity.

13. A signal processor according to claim 1 further comprising
   compression means coupled to the array for compressing the data signals by multiplying each data signal by a calculated scale factor.

14. A signal processor according to claim 13, wherein the compression means includes
   means for calculating said scale factor for each frame of data signals from all of the detector elements in the array for use in multiplying each data signal in the next subsequent frame of data signals, wherein the scale factor equals:

$$\frac{FS - 2C}{(A - B)};$$

A is the magnitude of the maximum value of the data signals in the frame;
   B is the magnitude of the minimum value of the data signals in the frame;
   C is a predetermined growth margin; and
   FS is the full scale value of the compressed data signals; and
   means for setting the scale factor for use in multiplying each data signal in the next subsequent frame at unity when (A−B) is less than a predetermined value thereby assuring that the value of the scale factor will always be less than or equal to unity.

15. A signal processor according to claim 14, wherein the means for calculating the scale factor comprises
   a successive approximation register;
   a multiplier means for multiplying the output of the successive approximation register by the value of (A−B); and
   a comparator for comparing the output of the multiplier means with the value of (FS−2C) and coupled to the successive approximation register for incrementing the successive approximation register until said comparison is equal, whereupon the value of said scale factor is provided at the output of the successive approximation register.

16. A signal processor according to claim 2, further comprising
   suppression means coupled to the array for suppressing background data from the adjusted data signals by subtracting a calculated background constant from each adjusted data signal to thereby provide output data signals in which said background data is suppressed.

17. A signal processor according to claim 16, wherein the suppression means includes means for calculating said background constant for each frame of adjusted data signal from all of the detector elements in the array, for use in subtraction from each adjusted data signal in the next subsequent frame of data signals wherein the background constant equals:

$$B - \frac{C(A-B)}{FS - 2C},$$

wherein
   A is the magnitude of the maximum value of the adjusted data signals in the frame;
   B is the magnitude of the minimum value of the adjusted data signals in the frame;
   C is a predetermined growth margin; and
   FS is the full scale value of the output data signals.

18. A signal processor according to claims 16 or 17, further comprising
   compression means coupled to the suppression means for compressing the suppressed data signals by multiplying each suppressed data signal by a calculated scale factor.

19. A signal processor according to claim 18, wherein the compression means includes means for calculating said scale factor for each frame of suppressed data signals from all of the detector elements in the array for us multiplying each suppressed data signal in the next subsequent frame of suppressed data signals, wherein the scale factor equals:

$$\frac{FS - 2C}{(A - B)};$$

and means for setting the scale factor for use in multiplying each suppressed data signal in the next subsequent frame at unity when (A−B) is less than a predetermined value thereby assuring that the value of the scale factor will always be less than or equal to unity.

20. A signal processor according to claim 1, further comprising a video display interface means, including a memory for storing a frame of data signals for all of the detector elements of the array;

address generating means for generating address signals for storing a frame of data signals in the memory and for reading the frame of data signals from the memory;

means responsive to said generated address signals for providing video coordinate signals to a video display; and means responsive to said read data signals for providing video information signals to said video display device concurrently with said video coordinate signals.

21. A signal processor according to claim 20, wherein the video display interface means further includes a crosshair generator for modifying the data signals read from the memory to cause a crosshair to be superimposed on the video display with data displayed in response to the data signals, wherein the position of the crosshair on said video display is controlled in response to a crosshair position signal provided to the crosshair generator.

22. A signal processor according to claim 1, further comprising a frame storage means including a memory for storing a frame of data signals for all of the detector elements of the array; and means for generating first address signals for addressing the memory in response to external timing and second address signals to cause said frame of data signals to be provided from the memory at a rate determined by said timing signals.

\* \* \* \* \*